March 11, 1947.  A. S. WINDELER  2,417,099
VARIABLE RESISTANCE STANDARD
Filed Aug. 31, 1943
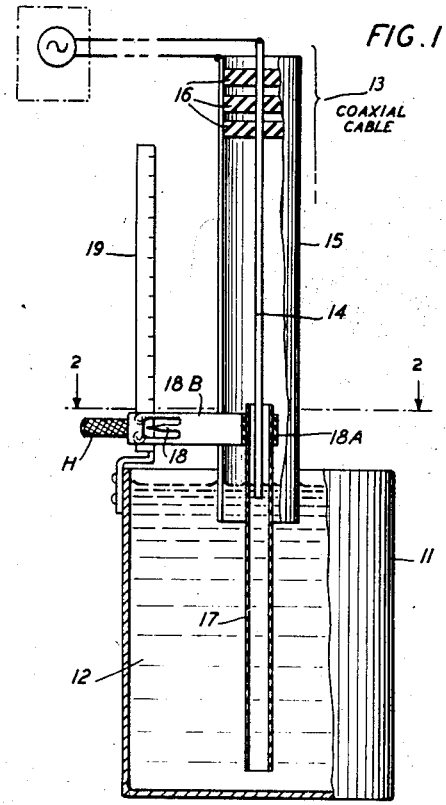
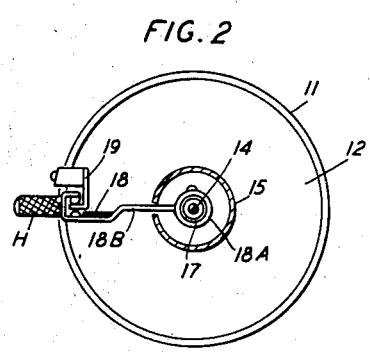
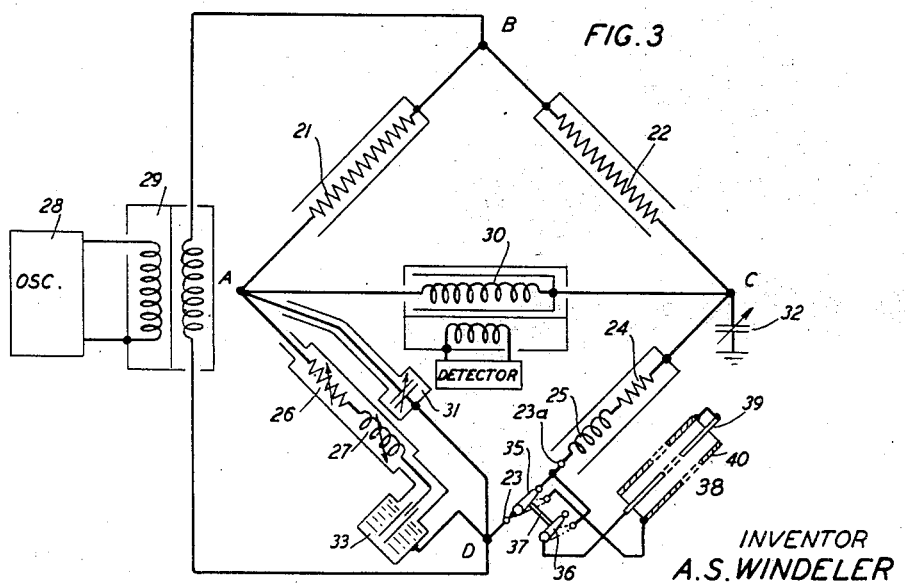
INVENTOR
A. S. WINDELER
BY
J. W. Schmied
ATTORNEY Patented Mar. 11, 1947

2,417,099

UNITED STATES PATENT OFFICE 2,417,099

VARIABLE RESISTANCE STANDARD

Alfred S. Windeler, Baltimore, Md., assignor to Bell Telephone Laboratories, Incorporated, New York, N. Y., a corporation of New York Application August 31, 1943, Serial No. 500,659

5 Claims. (Cl. 201—57)

This invention relates to impedance measuring arrangements and more particularly to an arrangement for measuring variable low resistances in circuits which are operated at high frequencies.

The object of the invention is to measure a resistance accurately variable with but small change of inductance within a range of values between zero and several hundredths of an ohm.

Measuring resistances in circuits operated at frequencies in the radio range are usually made on very short lengths of cable so that the value of the resistance to be measured is usually small. To obtain reasonable accuracy it is therefore necessary to measure to the nearest one-thousandth of an ohm. However, with slide wires or similar types of variable resistances the contact resistances are troublesome when reading to this accuracy. Also residual inductance in the variable resistance is usually so large that balancing of a Wheatstone bridge is made difficult since the change of inductance is more effective than the change in resistance in the megacycle frequency range.

According to the present invention there is provided in combination with a Wheatstone bridge a device comprising two electrodes coaxially arranged in a circuit operating at frequencies in the radio range, for measuring a variable resistance of very low value. The two electrodes are vertically suspended directly above a reservoir of mercury in such a manner as to penetrate the surface of the mercury enough to make a good contact.

A short narrow tube of some dielectric material impervious to mercury is arranged to surround the lower part of the inner electrode and adapted to be manually moved in a vertical direction, either up or down, so as to form a column of mercury of small cross section and of varying length as a continuation of the circuit including the inner electrode. The column of mercury inside the dielectric tube together with the return circuit made by the mercury outside of the tube forms a variable resistance as the tube is raised or lowered. The effective residual inductance in the circuit formed by the column of mercury within the tube and the return circuit path outside the tube is very small and the usual contact difficulties are avoided. A scale designed to read to the nearest one-thousandth of an ohm is controlled by the movement of the dielectric tube.

Another feature is a resistance accurately variable in small units with negligible variation of inductance for inclusion in a bridge circuit for making high frequency measurements.

A feature of the invention is its adaptability to measure low value resistances of cable in circuits operating at high frequencies.

A general feature is the use of a varying column of mercury to indicate a low resistance measurement whereby the usual contact difficulties are avoided.

Still another feature resides in the arrangement of the return circuit whereby the residual inductance is very small or negligible.

As a further feature the variation of inductance with variation of resistance is reduced to negligible amounts.

The invention will now be described with reference to the accompanying drawing wherein:

Fig. 1 shows an elevation view, partly in section, of the device itself separate from the bridge circuit;

Fig. 2 shows a cross-sectional view of Fig. 1 taken along dot and dash lines 2—2; and Fig. 3 shows an application of the device in a Wheatstone bridge arrangement.

Referring to Fig. 1, a reservoir, or vessel, 11 is filled with liquid mercury 12 to a level as shown. Vertically suspended above the reservoir is a pair of electrodes 13, the inner being in the form of a wire 14 centered in the outer which is in the form of a continuous tubing 15 except for a longitudinal slot provided for a slidable indicator 18. Insulative spacer discs 16 evenly spaced along the upper portion of the inner electrode 14 are provided for maintaining inner electrode 14 concentric with the outer electrode 15. The electrodes are so arranged with respect to the mercury in the reservoir that in their uppermost positions they slightly penetrate the surface of the mercury as shown. The length of the inner electrode 14 extending from the lowermost disc 16 to the mercury surface is determined by the amount of wire that can be suspended, without lateral support, to penetrate the surface of the mercury.

A tube 17 of dielectric material such as glass or porcelain having a length slightly in excess of that of the unsupported end of inner electrode 14, surrounds the unsupported end of the inner electrode and is mounted for free vertical movement. The tube 17 in its uppermost position encloses practically the entire length of the unsupported portion of the inner conductor and in its lowermost position extends to almost the bottom of the liquid mercury bath. The tube 17, at all times surrounds some part of the unsupported end of electrode 14 and is at the same time in contact with the mercury of the bath 12. In this manner a circuit is established which begins at a source of conventionally inducted high frequency, inner electrode 14, the column of mercury within the tube 17, the mercury outside of tube 17, and outer electrode 15, back to the source of high frequency. Fixedly attached to the uppermost portion of tube 17 is the indicator 18 slidably arranged in the slot longitudinally cut in outer electrode 15 as shown in Fig. 2. Indicator 18 is arranged to be manually moved by means of a knurled handle H, up or down, along scale 19 in order that the resistance in the circuit may be read to the nearest 0.001 ohm. The indicator 18 as shown in Fig. 2 is cut out of an element 18B which is premolded to form at its middle portion an offset and at its free end a U-shaped piece having on the inside of both legs button-head formations to produce a frictional bearing, or detent, on the scale, the knurled handle H serving as the means for moving element 18B. Element 18B is an integral part of collar 18A which is fixedly mounted on the uppermost portion of tube 17. Scale 19 may be fixedly mounted on reservoir 11 as shown in Fig. 1.

The column of mercury within tube 17 together with the return path made by the mercury 12 outside the tube 17 forms a variable low resistance in the circuit including inner electrode 14 and outer electrode 15, and by raising or lowering the tube 17 around inner electrode 14 with respect to the mercury bath 12, the length of column is varied and the resistance varies accordingly. The mercury within the tube accounts for substantially all of the variation.

Assuming that the inside diameter of tube 17 is 0.1 inch and the thickness of its wall is 0.005 inch, the change in resistance and inductance for each centimeter that the tube 17 is moved in a circuit operating at a frequency of 1 megacycle are about 0.003 ohm and 0.0002 microhenry, respectively. Accordingly, the applicant's device as shown in the drawing is a variable resistance with a range between zero and one-hundredth ohm should tube 17 be moved about 3 to 4 centimeters and between zero and two-hundredths ohms should the tube be moved twice the distance. The chief limitation upon the range of the device is the maximum length of the inner electrode 14 which can be left unsupported except at one end, that is, the unsupported electrode 14 below the lowermost disc 16.

Referring to Fig. 3 the Wheatstone bridge may be of a type constructed according to the principles of either or both of U. S. Patents 1,496,786 and 1,695,032 granted to W. J. Shackleton on June 10, 1924, and December 11, 1928, respectively. The bridge is composed of two ratio arms A—B and B—C, respectively having resistance elements 21 and 22 of equal value. The arm C—D including an unknown element connected between contacts 23 and 23a comprises a known resistance element 24 and a known inductance element 25. The arm A—D which is adapted to balance the unknown element includes a variable resistance standard 26, a variable inductance standard 27 and the applicant's resistance measuring standard 33. An oscillator 28 supplies current of a frequency in the radio range to the bridge circuit at points B and D in the usual manner through a transformer 29. Connected between points A and C is the bridge which includes transformer 30 connected to a detector of any suitable type adapted to indicate or detect high frequency current and to indicate a zero or null point. Physically the particular bridge arrangement is grouped into three units, one comprising the standard of inductance, another, the resistance standard and the third, the remaining parts of the circuit.

In operation contacts 23 and 23a are short-circuited and then air condensers 31 and 32 are adjusted to produce an initial, or zero, balance of the residual electrostatic capacitances of the apparatus. The standard of inductance 27 and standard of resistance 26 are alternately adjusted until the balance detector 30 indicates a condition of zero potential difference between the bridge points A and C to which it is connected. The inductance and resistance values as indicated in the standard are then equal, within the precision limits of the bridge.

There may be provided individual shields for each part of the Wheatstone bridge circuit, that is desired to function as an independent unit. Such shields can be connected to one of the terminals of the parts so enclosed. A type of shielding of the parts of a Wheatstone bridge is shown in U. S. Patent 1,695,032, supra. The impedance standard, or inductometer, consists of adjustable self-inductance elements represented by variable inductance element 27, used in series with an adjustable non-inductive resistance represented by variable resistance element 26.

The adjustable, non-inductive resistance, that is, variable resistance element 26, is a commercial dial resistance box to which a shield has been added. A shield may enclose, as shown in Fig. 3, both variable resistance element 26 and variable inductance element 27. The variable resistance element 26 is connected at one end to point A and at the other end to variable inductance element 27, the latter element being connected at its other end to the inner electrode 14 of the applicant's device 33. The shield enclosing elements 26 and 27 is connected at its ground end to the outer electrode 15 of device 33.

Preferably the inductometer will comprise one continuously variable element having minimum variation of resistance with setting and the minimum practical capacitance from the inductance coil to the shield. Likewise the resistance box will be a high quality drum dial type having minimum variation in residual inductance with setting and the minimum practical capacitance from the resistance coils to the shield. In the bridge described herein and designed for the megacycle range the inductometer will have a range of only two or three microhenries.

Various elements may be measured, such as the resistance of a copper wire, a stranded wire, a coaxial cable having its central conductor connected to contact 23a and its outer conductor connected at the same end to contact 23 with its conductors at the far end shorted, open or connected by the estimated or calculated characteristic impedance or a variable impedance, or the coaxial cable may have its central wire connected to contacts 23 and 23a at its ends and the outer conductor solidly grounded to the shield of the bridge. In short the device may be used to measure the resistance of any conductor connected to terminals 23, 23a in any manner suitable to present a small value of resistance, the exact ascertainment or measure of which may be considered useful.

A method of making a typical measurement by means of the applicant's invention, of the variable low resistance of an element in a circuit operating at a frequency current of 5 megacycles will now be described. A short circuit comprising blade 35 of a double pole, double throw switch 37 is normally connected across gap 23—23a as shown in Fig. 3, and the bridge balanced by adjusting variable inductance element 27 and by adjusting variable resistance element 26 and, if necessary, adjusting and readjusting all the variable elements. The balance is established with resistance element 26 while the variable low resistance device 33 is set at minimum value (tube 17 in its uppermost position) and it may then be operated by moving tube 17 down to obtain an absolutely balanced condition. The readings in A—D may be assumed to be resistance 0.232 ohm and inductance 0.102 microhenry. By operating switch 37 the short circuit is then replaced by a 10-foot length of coaxial cable 38 which it is desired to measure and the bridge is again balanced. We may assume that at one end outside conductor 40 is connected to a switch contact in engageable relation over blade 35 with contact 23, the central conductor 39 is connected by means of switch blade 36 in its operated position to contact 23a, and that at the far end the conductors are fixedly conductively interconnected. The readings in A—D with the 10-foot cable 38 in circuit are 0.702 ohm and 1.102 microhenries. The resistances by means of the indicator 18 when moved up or down along scale 19 to maintain a balanced condition in the circuit can be read to the nearest 0.001 ohm. The device of Fig. 1 because of its negligible variation in inductance with setting, makes balancing the bridge easier than with the usual slide wire. The desired resistance is then the difference in the two readings or 0.702 minus 0.232 which equals 0.4600. Likewise the inductance is 1.102 minus 0.102 or the difference of 1.00 microhenry.

What is claimed is:

1. A substantially non-inductive variable electrical resistor comprising an enclosure of conducting material, a conducting substance within said enclosure, a pair of electrodes disposed above said enclosure and having their lower ends inserted a slight distance into said substance, a tube of impervious insulative material surrounding one of said electrodes and extending into said substance to provide a controllable conductive path in said substance between said electrodes, operational means for varying the depth of penetration of said tube into said substance to thereby vary the resistance of said path, said path comprising spacially parallel, operable legs regulated by said means, maintained substantially equal in length at all times and adapted to conduct in opposite directions for minimizing inductive impedance to alternating current.

2. A substantially non-inductive variable electrical resistor comprising an enclosure of conducting material, a conducting substance within said enclosure, a pair of electrodes having an outer electrode in tubular form and an inner electrode unsupported for the greater part of its length, said electrodes being fixedly disposed above said enclosure and having their lower ends penetrating the top surface of said substance just sufficient to make satisfactory contact with said substance, said outer electrode extending slightly deeper into said substance than said inner electrode, a tube of impervious dielectric material surrounding said inner electrode and out of contact therewith, operational means arranged to slide said tube along said inner electrode, said tube in its lowermost position forming a column of said conductive substance for almost its entire length and in its uppermost position forming a column of said substance of substantially no length, a source of alternating current and circuit means connected thereto and including said substance of variable length within said tube and said substance outside of said tube, arranged to substantially neutralize the residual inductance caused by the alternating current from said source, and indicating means controlled by said operational means when said tube is moved upward and downward in a slot longitudinally formed in said outer electrode for furnishing resistance values to one-thousandths of an ohm.

3. A substantially non-inductive variable resistor comprising a vessel containing a conductive liquid, a pair of electrodes disposed above said vessel and having their lower ends inserted a slight distance into said liquid, a tube of insulative material surrounding one of said electrodes and extending into said liquid to provide a controllable conductive path in said liquid between said electrodes, operational means for varying the depth of penetration of said tube into said liquid to thereby vary the resistance of said path, said path comprising spacially parallel, operable legs, regulated by said means, maintained substantially equal in length at all times and adapted to conduct in opposite directions for minimizing inductive impedance to alternating current.

4. A substantially non-inductive variable resistor comprising a vessel containing a conductive liquid, coaxially arranged electrodes fixedly disposed above said vessel and having their lower ends penetrating the top surface of said liquid just sufficient to make satisfactory contact with said liquid, a tube of insulative material having a non-porous wall for its entire length and surrounding and extending below one of said electrodes, means for moving said tube to any point within a range of approximately the full depth of said liquid to provide a single variable conductive path through said liquid between said electrodes, said path comprising legs substantially equal in length at all times and arranged to permit the flow of alternating current in opposite directions whereby the inductive impedance in said path is minimized.

5. A substantially non-inductive variable resistor comprising a vessel containing a conductive liquid, a pair of electrodes disposed coaxially above said vessel and having their lower ends extending slightly into said liquid, a tube of insulative material having a non-porous wall for its entire length and surrounding and extending below one of said electrodes to provide a single controllable conductive path in said liquid between said electrodes, operational means for moving said tube up and down through said liquid whereby the legs of said path are maintained substantially equal in length at all times, to vary the length of said path below said electrodes and therefore the resistance of said path during operation, and means for indicating to thousandths of an ohm the variation in the resistance of said path effected by the operation of the first-mentioned means.

ALFRED S. WINDELER.

REFERENCES CITED

The following references are of record in the file of this patent:

UNITED STATES PATENTS

| Number | Name | Date |
| --- | --- | --- |
| 1,002,637 | Von Brockdorff | Sept. 5, 1911 |
| 1,664,250 | Eynon | Mar. 27, 1928 |
| 1,660,251 | Burnan | Feb. 21, 1928 |

FOREIGN PATENTS

| Number | Country | Date |
| --- | --- | --- |
| 101,381 | Australia | July 1, 1937 |
| 106,275 | Australia | Jan. 12, 1939 |